UNITED STATES PATENT OFFICE.

JOSEPH B. WILSON, OF TOWNSEND'S INLET, NEW JERSEY.

IMPROVEMENT IN COMPOSTS.

Specification forming part of Letters Patent No. 175,846, dated April 11, 1876; application filed December 16, 1874.

*To all whom it may concern:*

Be it known that I, JOSEPH B. WILSON, of Townsend's Inlet, in the county of Cape May and State of New Jersey, have invented certain new and useful Improvements in Composts; and I do hereby declare the following to be a full, clear, and exact description of the invention, such as will enable others skilled in the art to which it pertains to make and use it, reference being had to the accompanying drawings, which form part of this specification.

My invention relates to an improvement in composts; and it consists in forming layers of mud, muck or marl, manure or guano, and salt, and pouring over these layers a dilution of sulphuric acid, and then upon the whole of these placing a layer of lime. These ingredients are placed in a box that is as near air-tight as possible, and covered over with a thick layer of sand or earth, so as to exclude all atmospheric influences due to electrical and other causes, and left for about thirty days, when it will be found that the whole mass has become thoroughly decomposed and is ready to be used.

When animal manure is used as a fertilizer and spread upon the ground, it has been found that it requires about three months for it to become thoroughly decomposed, by which time a large proportion of its gases have escaped into the air and been lost. One of the great advantages of my present invention is, that this manure is decomposed before being used, so that when placed on or in the ground it is at once ready for the assimilation of the earth. In order to exclude all atmospheric and electrical changes from the mass during decomposition, and in order to make the compost in the field where it is to be used, or in any desired place, I make use of a box of peculiar construction, which can be readily put up and taken apart; but as this box forms the subject of another application, no further mention need be made of it here.

In the manufacture of my compost I erect my box in the field, or at any desired suitable point, and spread ten tons of mud, muck, or marl over its bottom, and on top of this is evenly spread five tons of manure, or its equal of guano. In order to facilitate the use of guano it may be dissolved in water to about the thickness of molasses, and then poured on the mud, muck, or marl. Upon these two layers is spread two bushels of ground salt, and then upon all of these is poured a solution of sulphuric acid, of about one gallon of acid to one barrel of water. Upon all of these is then placed five bushels of slaked lime. The box can be filled by a single layer of each of the ingredients above described, or they can be repeated as often as may be necessary to make as large a mass of the compost as may be desired. Upon the top of the whole mass is spread a layer of earth or sand, so as to act as a sealing medium, to exclude the air until decomposition takes place.

Having thus described my invention, I claim—

A compost composed of mud, muck or marl, manure or guano, salt, solution of sulphuric acid, and lime, these ingredients being mixed in or about the proportions given, and protected from the action of the air by suitable means, substantially as specified.

In testimony that I claim the foregoing I have hereunto set my hand and seal this 12th day of December, 1874.

JOSEPH B. WILSON. [L. S.]

Witnesses:
J. MILTON TOWNSEND,
WILLIAM T. WILSON.